Nov. 8, 1966 E. R. EVANS 3,284,578

DIRECT-DIALING LONG-DISTANCE TELEPHONE SYSTEMS

Filed Feb. 11, 1963 3 Sheets-Sheet 1

DIRECT-DIALING LONG-DISTANCE TELEPHONE SYSTEMS

Filed Feb. 11, 1963 3 Sheets-Sheet 2

(DIAL 1)

(DIAL 2)

DIRECT-DIALING LONG-DISTANCE TELEPHONE SYSTEMS

Filed Feb. 11, 1963

3 Sheets-Sheet 3

United States Patent Office 3,284,578

Patented Nov. 8, 1966

3,284,578

DIRECT-DIALING LONG-DISTANCE TELEPHONE SYSTEMS

Earl R. Evans, Bergenfield, N.J.
(580 Bedford Road, Pleasantville, N.Y.)

Filed Feb. 11, 1963, Ser. No. 257,721
7 Claims. (Cl. 179—90)

This invention relates to switching controls for telephone systems having automatic switching apparatus arranged for direct dialing of long distance calls by employing so-called "direct-dialing" codes.

It is generally recognized that direct-dialing of long distance calls, while convenient and time-saving, has the disadvantage that frequently such calls are made by unauthorized persons or children, or a direct-dialing code is dialed by mistake. This leads to arguments over billing for telephone service, wasteful use of telephone facilities with resulting overloading of toll trunks, and other difficulties. Restricted service systems have been proposed which limit the operation of certain designated subscriber's stations to the placing of local calls. However these systems ordinarily require special circuits or equipment in the telephone exchange, and have the further disadvantage that unrestricted service is always impossible even though direct dialing of a long distance call by an authorized party may frequently be desired.

One object of the present invention is to provide a switching control system which normally prevents the direct dialing of a long distance call without special exchange circuits or equipment, but permits unrestricted use of the switching system by an authorized person at any time.

Another object of the invention is to provide means to restrict the placing of unauthorized long distance calls in a direct-dialing telephone system that requires only minor additions or modifications to the apparatus now used in systems to which the invention is applicable.

Still another object of the invention is to provide an impulse calling device, such as the common subscriber's dial, with means to lock, impede or disable the calling device when an attempt is made to dial the digits of a code such as the direct-dialing code, so that the succeeding digits of the number of the wanted line cannot be dialed.

A still further object of the invention is to provide mechanism responsive to successive digits of an area code for locking or disabling the calling device which, being mechanical, can be applied in an obvious manner to any form of manually controlled pulse-producing device including the dial and push-button types.

With the above and other objects in mind, as will appear from the following detailed description of one embodiment of the invention, the calling device at the subscriber's station of a telephone system is modified to respond to the significant digits of the area code (which precedes the impulse code representing the line or telephone of the wanted party). The area code at least in part is reserved for use in direct dialing, and is not used for the code numbers of subscriber's lines. Thus in one system (Bell Telephone), the first two digits of area codes are either X1 or X0 (where "X" is 2, 3, 4, 5, 6, 7, 8 or 9) and these two digits are not used in the same order and position for line numbers. This is necessary to avoid the accidental dialing of the long distance selection codes (area codes).

In accordance with the invention, the calling device in the form to be described for purposes of explanation includes mechanism responsive to these two digits X1 or X0 for disabling the calling device and/or releasing the switching apparatus to prevent the placing of the call. The calling device is reset to normal manually, by depressing a pushbutton, or by replacing the telephone on the cradle or switchhook. Thus the telephone set can be used for local calls at any time.

For a better understanding of the invention, reference may be made to the following specification in connection with the accompanying drawings, in which FIG. 1 is a side view of a telephone set of the combined type embodying the invention, with the telephone removed from the cradle;

In accordance with the embodiment of the invention to be described herein, subscriber's stations are restricted in the placing of long distance calls by mecahnism in or coupled to the calling device which is responsive to the setting up of the area code, usually a multiple digit code, preceding the code number of the wanted line. By way of example, the invention will be described as applied to a calling device of the dial type but obviously it can be incorporated in any form of mechanical calling device. When the area code is dialed, the code-responsive mechanisms locks or impairs the dial, or releases the line or exchange switching equipment so that the call cannot be completed. Thus the invention in a broad sense involves mechanism which distinguishes between area codes and the codes used to designate subscriber's lines.

Figure 1:
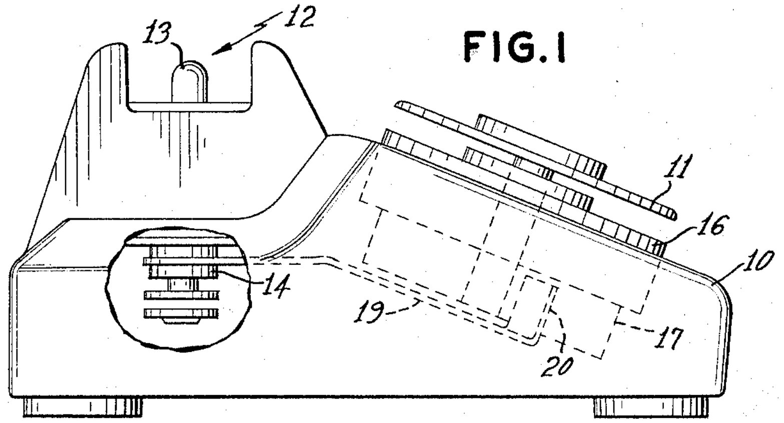
Figure 2:
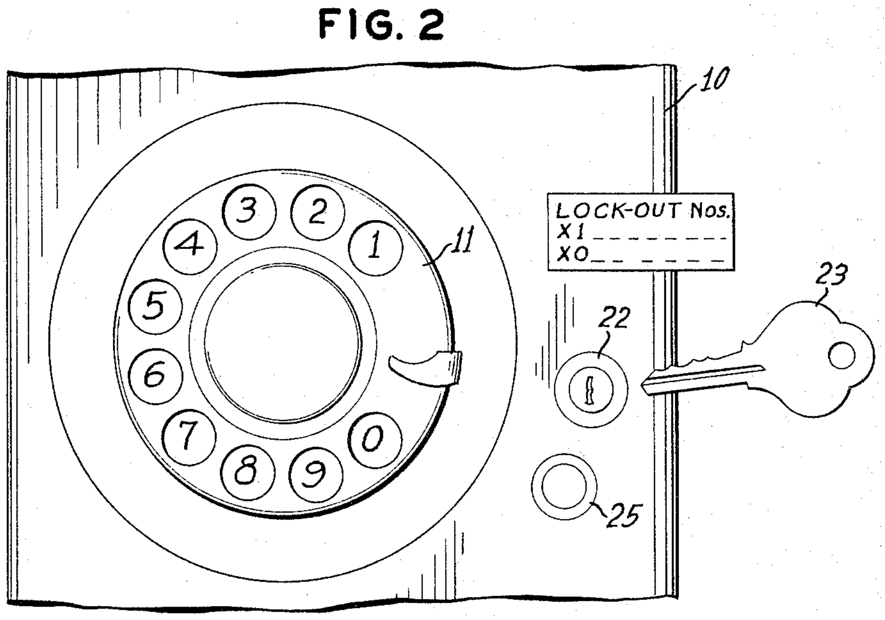
FIG. 2 is a partial front view of the set of FIG. 1.

Referring to the drawings, FIGS. 1 and 2 show a typical combined telephone set as used in subscriber's stations, having a base 10 provided with a rotatable dial 11 for transmitting impulse codes consisting of successive digits to control the automatic switching equipment at the exchange. The base 10 is further provided with a cradle 12 for supporting the transmitter-receiver unit (not shown). Two vertically movable pins 13 are supported on a frame 14 inside the base 10, said pins being depressed when the transmitter is placed in the cradle and arranged to operate contact means to close the line circuit when the telephone is removed from the cradle. The telephone set as described to this point is conventional and familiar to all telephone users, and requires no elaboration.

Behind the impulse-dial mechanism 16 is arranged a code responsive and dial-locking mechanism 17 coupled to the shaft of the rotatable dial 11. A lateral arm or lever 19 extends from the frame 14, said lever being provided with an offset portion 20 cooperating with the dial locking mechanism, as will be described below. The arm 19 is shown in its upper position, the arm being depressed when the telephone is replaced in the cradle 12 either at the completion of a call or to permit the resetting of the locking mechanism 17. In order to render the locking mechanism operative when the subscriber wishes to prevent unauthorized use of the telephone for making long distance calls, a key operated lock 22 is provided, said lock being controlled by a key 23 carried by the subscriber when he is not in the vicinity of the telephone. The base of the telephone set also carries a pushbutton 25, a shown, for releasing the dial 11 after it has been disabled by the code-responsive mechanism 17.

Figure 3:
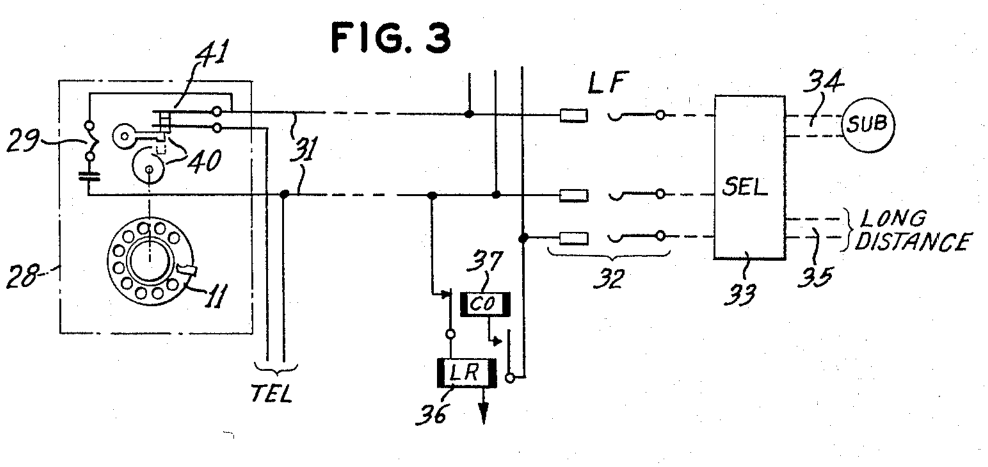
FIG. 3 is a circuit diagram, partially schematic, of a telephone system embodying the invention and including the telephone set shown in FIGS. 1 and 2.

FIG. 3 is a diagram of a direct-dialing long-distance telephone system embodying the invention. As shown, the system includes a subscriber's station 28 having, in addition to the usual dial 11 and ringer 29, dial-latching or locking means 40 rendered operative in response to the dialing of an area code in a manner to be described. As shown the latching means 40 may also be arranged to operate contacts 41 in the line circuit to release the call or prevent further dialing control. The detailed circuits of the subscriber's station form no part of the present invention and may, for example, be similar to those shown in the prior patent to W. H. Edwards et al., No. 2,372,262 dated March 27, 1945. The station 28 is connected to the local exchange through line circuit 31 terminating in line finder 32 associated with the usual selective switching equipment 33 for extending calls to local subscribers represented by the called line 34, or to remote subscribers through trunk circuits represented by the conductors 35. The switching system also includes many other components, for example, line and cutoff relays 36 and 37, the nature and function of which are well known to those skilled in the art.

It is a feature of the invention that direct dialing of long distance calls is prevented by code-responsive means associated with the calling device 11, without the necessity of providing special circuits or equipment at the exchange. This system has the further advantage that direct dialing of such calls can be made easily and without delay by the subscriber or other authorized party possessing the key 23 for disabling the dial locking mechanism. As stated above, the prevention of direct dialing of calls is attained by utilizing the fact that significant digits of the area code are reserved for that use, and are not used in the same order and position for the codes representing local lines. For purposes of explanation, it will be assumed that the pairs of digits 21, 31, 41 . . . 91 and 20, 30, 40 . . . 90 are confined to use as the start elements of area codes, and are not used as the first pair of digits in any local code. Since the area code precedes the code of the called line in dialing a call, the invention contemplates code-responsive means responsive to the first two digits of the said area codes for disabling or disturbing the operation of the calling device or dial, such means being unresponsive to all local codes.

Figure 4:
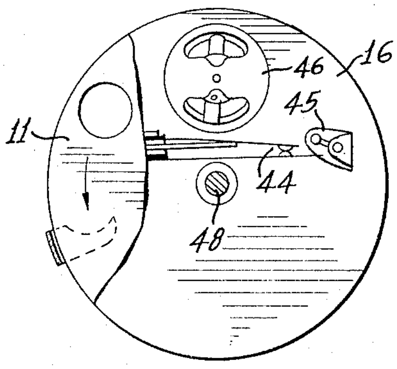
FIG. 4 is a rear view of the impulse dial of the telephone set of FIGS. 1 and 2, taken on the line 4—4 of FIG. 5.

FIG. 4 shows a conventional dial mechanism for transmitting impulse codes to control the switching equipment 33 at the exchange. The pulsing contacts 44 are actuated by the actuator 45 for each digit dialed, depending upon the arc through which the dial 11 is turned, a governor 46 being provided to control the speed of the return movement of the dial and consequently the rate of operation of the impulse contacts 44. The dial 11 is attached to a shaft 48 which extends through the rear of the casing, as shown. The off-normal contacts and other elements of the common dial have been omitted for the sake of clarity.

Figure 5:
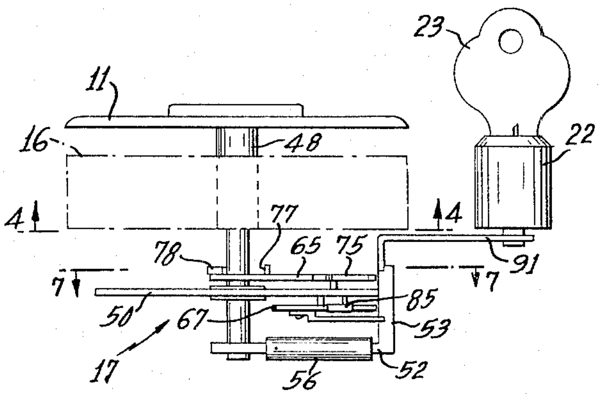
FIG. 5 is a side elevational view of the principal parts of the dial locking device at the rear of the dial.
Figure 6:
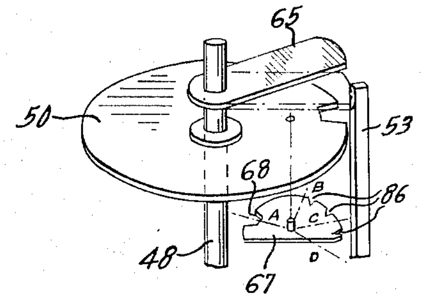
FIG. 6 is an exploded view showing the relation between the movable elements of the code mechanism, with actuating members omitted for the sake of clarity.
Figure 14:
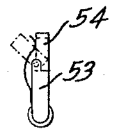
FIGS. 14 and 15 are end and side elevations, respectively, of the latch or locking element which locks or impedes the dial.
Figure 15:
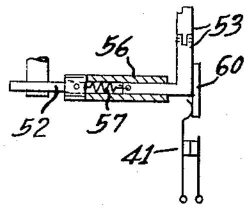

FIG. 5 is a detail view showing the dial locking or disabling mechanism 17 mounted on an extension of the shaft 48 behind the dial impulse mechanism 16, and FIG. 6 is an exploded view showing the relation between elements of the code-responsive mechanism which are positioned by the first and second digits dialed, respectively. Referring to these figures of the drawing, the mechanism includes a fixed supporting plate 50 and a radial arm 52 attached to the rotatable shaft 48. The radial arm 52 rotating with the dial 11 has an offset end portion 53 which is radially movable in the sleeve 56 (see FIG. 15) and is biased toward the shaft 48 by a spring 57, so that it rides on the edge of the disc or plate 50. The tip end of the offset portion 53 is arranged and constructed to provide one-way drive for the code-responsive mechanism, as indicated at 54, 55 in FIG. 14. The radially movable arm or member 53 carries an insulating block 60 which opens the line contacts 41 (see FIGS. 3 and 15) upon radial movement of the member 53.

The code-responsive mechanism comprises mainly two movable elements or plates 65 and 67 which are positioned by the projection 53 turned by the dial 11, and when set by dialing of an area code are effective to lock the dial. As shown in FIG. 6, the pivoted plate 67 is formed with a notch 68. As the first three digits of a code are dialed, the plate 67 is turned from "A" to "B," "B" to "C," and "C" to "D," and in position "C" it will be lined up with a notch 70 in the fixed disc or plate 50. The pivoted plate 65 is controlled by the particular digit of a code dialed, i.e., 1, 2 . . . or 0, and when moved to the position shown in dotted lines in FIG. 6 covers the notch 70 in the disc 50, and prevents the latching of the dial 11 by the engagement of the bar 53 with said notch 70 even if the notch 68 is lined up with the notch 70. This prevents disabling the dial after dialing the second digit if it is not 1 or 0 (used in the area code). Upon the dialing of the third digit of the code, the plate member 67 is moved to the final position "D," in which the notch 68 is not lined up with the notch 70, and the dialing of further digits is not prevented or impeded. On the other hand, if the second digit dialed is 1 or 0 (indicating that an area code is being dialed) the plate member 65 is in the position shown in full lines in FIG. 6 when the member 67 reaches position "C," the dial arm 53 moves to engage the notch 70 and the dial 11 is positively locked against actuation. Obviously instead of a latching device, equivalent means such as a brake may be employed to disable or impair the operation of the calling device in a manner to prevent the completion of the call.

Figure 7:
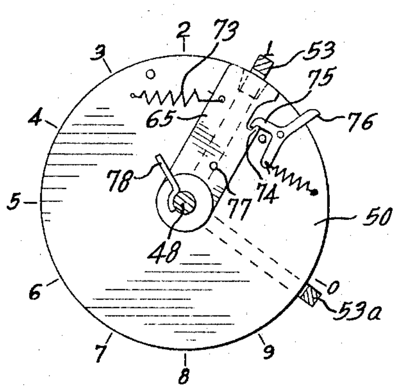
FIGS. 7, 8 and 9 are views showing the positions assumed by one of the movable members of the code-responsive mechanism after dialing different digits.
Figure 8:
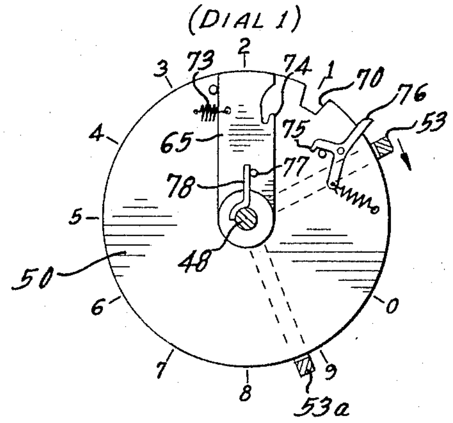
Figure 9:
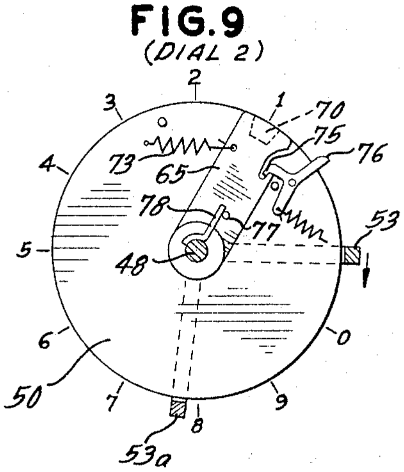

FIGS. 7, 8 and 9 show the detailed construction of the plate 65 and associated elements, FIG. 7 showing the parts in the normal unoperated condition; FIG. 8 showing the result of turning the dial through an angle corresponding to dialing the digit 1; and FIG. 9 showing the result of dialing a digit from 2 to 9. The member 65 is biased to the left by a spring 73, and is provided with a tooth or projection 74 for engagement with a latch member 75 having an actuating portion 76 extending into the path of movement of the dial arm 53. Upon dialing any digit of a code (including the 2nd digit of an area code), if 1 is dialed the actuation of the member 75 releases the plate member 65 and it assumes the position shown in FIG. 8 if not already in that position. As shown in FIG. 9, further movement of the dial arm 53 resulting from dialing any of the numbers 2 to 9, returns the plate member 65 to the position in which the notch 70 is covered, this being effected by a spring 78 on the shaft 48 engaging pin 77 on member 65. If the digit dialed is 0, a dial arm 53*a* located at a point 90 degrees in advance of the arm 53 actuates the latch projection 76 of latch 75 to release the plate member 65. Thus if either 1 or 0 is dialed, the plate member 65 is unlatched and deflected to the left to uncover the notch 70 which is alined with the dial arm 53 when the latter returns to normal after each digit is dialed. However the latching of the arm 53 only occurs when 1 or 0 is dialed as the second digt (assumed to be reserved for area codes). This is controlled by the second plate member 67.

Figure 10:
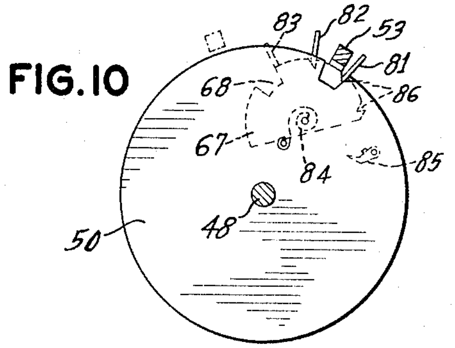
FIGS. 10–13 are similar views showing the positions assumed by the other movable member of the code-responsive mechanism after dialing successive digits of a code.
Figure 11:
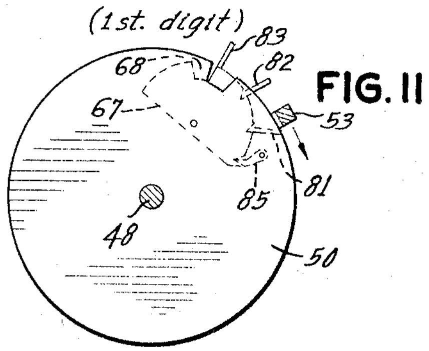
Figure 12:
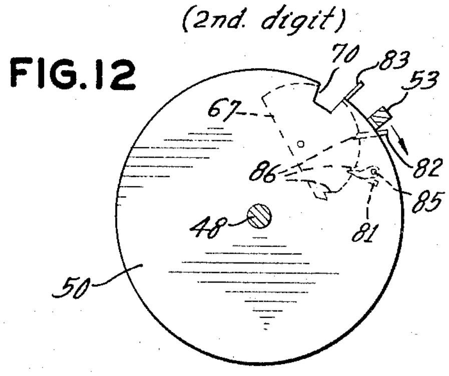
Figure 13:
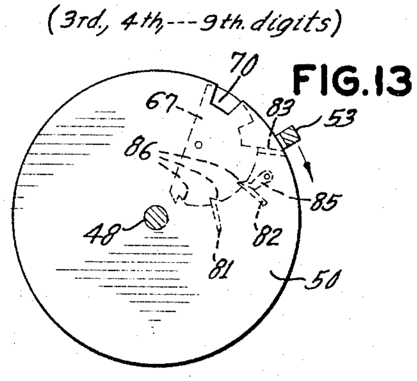

FIGS. 10 to 13 show the detailed construction of the plate member 67 and associated parts, FIG. 10, showing the member 67 in the initial or start position; and FIGS. 11, 12 and 13 showing the positions to which the member 67 is moved as a result of dialing the 1st, 2nd and 3rd digits of the code, respectively. The member 67 is provided with flexible pins or spring members 81, 82 and 83 for successive engagement by the dial arm 53 during manipulation of the dial, said member being biased to its normal position by a spring 84. Means such as a locking pawl 85 engaging spaced teeth 86 on the plate member 67 is provided to hold the same temporarily in the respective positions as shown in FIGS. 11–13. Dialing the second digit lines up the notch 68 in plate member 67 with the notch 70, so that if the second digit is 1 or 0, the dial arm 53 moves into the notch to lock the dial 11 against further movement. When the pawl 85 is disengaged to release the locking mechanism for another call, the member 67 returns to the normal position shown in FIG. 10, and the sloping edge of the plate adjacent the notch 68 cams the dial arm 53 out of the notch 70, so that the dial is free to turn.

It will be apparent therefore that whenever the first two digits X1 or X0 of an area code are dialed, the code responsive mechanism locks up or impairs the further operation of the dial, thus preventing the placing of long distance calls by unauthorized parties. If the code dialed is not an area code, the mechanism does not affect the functioning of the calling device.

Figure 16:
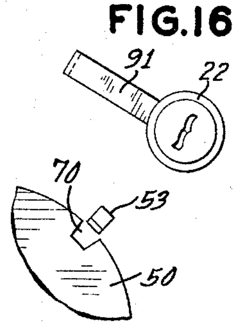
FIGS. 16 and 17 illustrate a form of key-operated mechanism for disabling the code locking device when desired.
Figure 17:
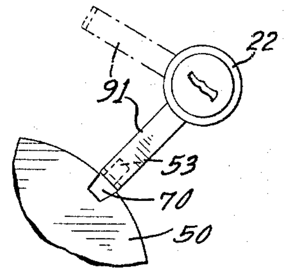

As shown in FIGS. 16 and 17, the barrel of the lock 22 is provided with a radial arm 91 adapted to block the entry of the dial arm 53 into the notch 70 in plate 50 (see FIG. 17) to render the dial locking mechanism inoperative. The direct dialing of long distance calls is then permitted.

Figure 18:
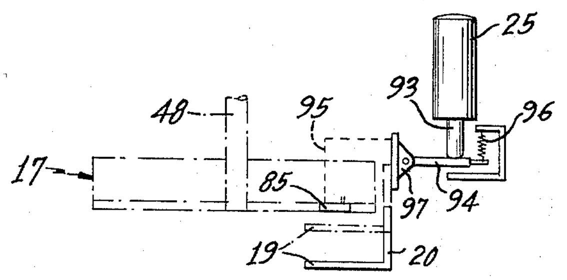
FIG. 18 is a detail view of the pushbutton arrangement for resetting the dial-locking mechanism to normal.

The resetting of the code readout mechanism to normal is accomplished by or only after replacing the telephone in the cradle 12. The resulting movement of the frame 14 and arm 19 may be employed to reset the mechanism to normal, as known in the prior art, but preferably the pushbutton 25 is used. As shown in FIG. 18, the pushbutton 25 has an extension 93 engaging the pivoted arm 94 adapted to lift the pawl 85, by a mechanical linkage as indicated diagrammatically by the dotted line connection 95. A spring 96 biases the pushbutton 25 and arm 94 to their normal positions. In order to insure that the telephone is replaced in the cradle before resetting the locking mechanism, thereby releasing switching equipment in the exchange, the offset portion 20 of the arm 19 attached to the frame 14 obstructs the movement of the arm 94 until the telephone is replaced in the cradle 12. The depression of the frame 14 lowers the offset portion 20 of the arm 19 to the position shown in FIG. 18.

The invention is not limited to the illustrative details shown and described, since many equivalent constructions will readily occur to those skilled in the art.

What is claimed is:

1. In a direct-dialing telephone system, in combination, subscriber's lines,
switching equipment for interconnecting said lines,
pulse-producing means associated with each of said lines including a rotatable dial for controlling said switching equipment, and
means responsive to operation of said dial only to positions representing digits of numbers in codes in which a digit after the first digit is a "one" or "zero" for disabling the dial by impairing its normal rotative operation to thereby prevent the completion of the switch-control cycle.

2. A telephone system according to claim 1, in which key-controlled means is provided for enabling authorized use of the dial pulse-producing means to complete the control cycle including said dial positions to which said disabling means is responsive.

3. In a direct-dialing telephone system having subscriber's stations connected by lines to exchanges, said subscriber's stations being designated by code numbers and, in the case of long distance calls, by additional area codes in which the second digit is a "one" or "zero," in combination,
calling devices at said subscriber's stations for setting up the numbers and area codes of called lines,
said calling devices including a manually adjustable dial, and
means coupled to said dial for preventing further operative adjustment thereof after the subscriber has initiated an area code selection by dialing a first digit followed by dialing "one" or "zero."

4. In a telephone system having selective switching means responsive to area codes in which a digit other than the first digit is a "one" or "zero" for extending calls through long-distance trunks, and subscriber's stations provided with calling devices for controlling said switching means, in combination,
means at the subscriber's stations for restricting the use of the calling devices for placing long-distance calls comprising a disabling latch member, and
means for rendering said latch member operative in responsive to manipulation of the calling device to set up any of said area codes.

5. In a telephone system employing long-distance dialing codes for long distance calls to called lines, said long-distance codes having distinctive digital characteristics not generally used in the code numbers assigned to the lines including as the second digit either "one" or "zero," in combination,
subscriber's stations provided with dial-controlled means for transmitting control pulses over said lines, and
means for impeding the operation of said dial-controlled means only in response to the initiation of a call by dialing of a long-distance code containing as the second digit "one" or "zero."

6. A calling device for transmitting control pulses in an automatic telephone system employing area codes preceding the regular codes assigned to subscriber's lines, comprising
code-transmitting contacts,
means including a manually adjustable member for selectively operating said transmitting contacts in accordance with the successive digits of said codes, and
disabling means for said adjustable member responsive to the selective adjustment of the calling device made in setting up an area code in which the second digit is a "one" or "zero" whereby calls to area-code numbers are prevented.

7. In a direct-dialing telephone system employing multiple-digit area codes in which one digit is a "one" or "zero," in combination,
subscriber's lines,
switching equipment for interconnecting said lines,
pulse-producing means including a rotatable dial on each of said lines for controlling said switching equipment by said subscribers, and
means including code-responsive means positioned by said dial for impairing the rotation of said dial to modify the operation of said pulse-producing means in response to setting up thereby any of said area code containing said digit "one" or "zero."

(References on following page)

References Cited by the Examiner

UNITED STATES PATENTS

| | | | |
|---|---|---|---|
| Re. 20,496 | 9/1937 | Dunham | 179—90 X |
| 2,216,850 | 10/1940 | Marti | 179—90 |
| 3,055,984 | 9/1962 | Smith | 179—27.021 |
| 3,221,109 | 11/1965 | Day et al. | 179—27.021 X |

FOREIGN PATENTS

| | | |
|---|---|---|
| 389,661 | 3/1933 | Great Britain. |

KATHLEEN H. CLAFFY, *Primary Examiner.*

ROBERT H. ROSE, *Examiner.*

R. LINN, *Assistant Examiner.*